United States Patent

LaHay

[15] 3,635,213
[45] Jan. 18, 1972

[54] METHOD OF DETERMINING THE PRESENCE OF CYSTIC FIBROSIS

[72] Inventor: James F. LaHay, St. Louis, Mo.
[73] Assignee: Sherwood Medical Industries Inc.
[22] Filed: Nov. 28, 1969
[21] Appl. No.: 880,810

[52] U.S. Cl.....................128/2 R, 119/14.14, 128/2.1 R, 324/30
[51] Int. Cl. ..........................................A61q 5/05
[58] Field of Search.....................128/2.1; 324/30

[56] References Cited

UNITED STATES PATENTS

| 1,518,211 | 12/1924 | Maue | 128/1 |
| 3,516,876 | 6/1970 | Hauffe | 324/30 X |
| 3,534,733 | 10/1970 | Phipps | 128/21 R |
| 3,399,666 | 9/1968 | Broach | 128/2.1 R |
| 2,195,019 | 3/1940 | Bloomheart | 128/2.1 R |

FOREIGN PATENTS OR APPLICATIONS 610,545 10/1948 Great Britain......................119/14.14

*Primary Examiner*—Aldrich F. Medbery
*Attorney*—Donald S. Olexa, Jerome M. Teplitz, John G. Heimovics, William G. Lawler, Jr. and Hofgren, Wegner, Allen, Stellman and McCord

[57] ABSTRACT

A disposable combination collection and measuring electrode which may be strapped to a patient to collect sweat stimulated by iontophoresis and which may be connected to an analyzing instrument for analyzing the conductivity of the collected sweat in a manner so as to preclude evaporation and minimize the possibility of contamination. The collection and measuring electrode is formed of a funnel shaped plastic element and in the base thereof, there are located two electrodes of a precise length and spaced from each other a precise distance. The base is configured so that a sample as small as 19 microliters may be used for analysis.

5 Claims, 6 Drawing Figures

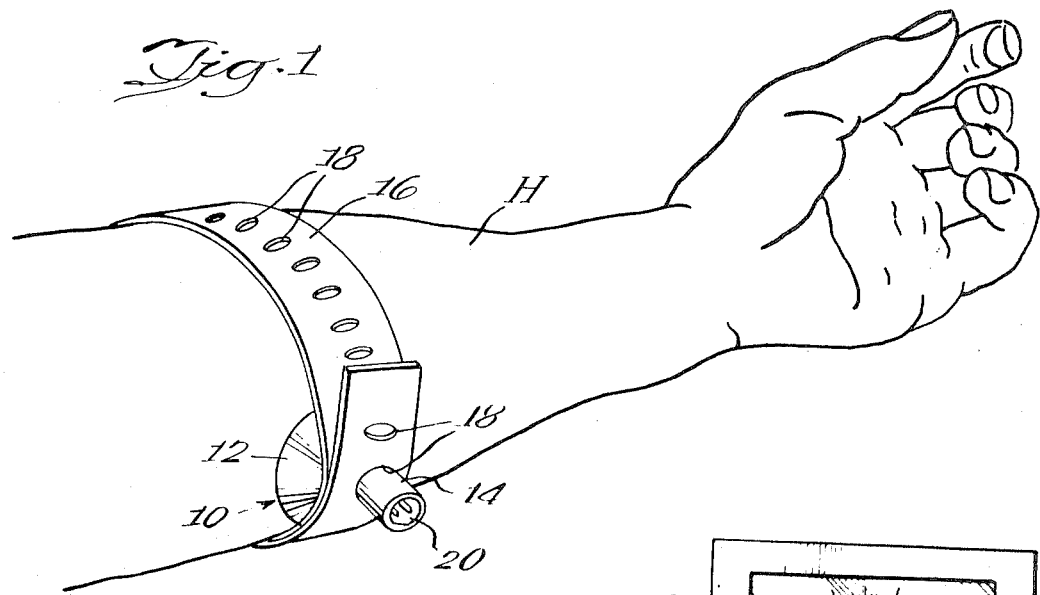

THE METHOD OF DETERMINING THE PRESENCE OF CYSTIC FIBROSIS

BACKGROUND OF THE INVENTION

Certain diseases, and in particular, cystic fibrosis, may be diagnosed by analysis of sweat. For example, in the detection of cystic fibrosis in children, use is made of the fact that the great majority of children suffering from cystic fibrosis have an abnormally high concentration of sodium chloride in their sweat. The sweat of a normal child will have a chloride level up to about 40 milliequivalents per liter while about 98 percent of children afflicted with the disease will have a chloride level in their sweat from about 60 to 160 milliequivalents per liter.

Using the foregoing knowledge, the medical profession has long regarded a standard sweat test as the simplest and most reliable test for cystic fibrosis. The standard sweat test involves inducing sweat by introducing pilocarpine into the patient through the known technique of iontophoresis and thereafter collecting the sweat thus induced and analyzing the same by any of a variety of methods for chloride ion concentration. Quite frequently, chloride ion concentration is determined by analyzing the conductivity of the sweat sample and relating that value to the concentration of a sodium chloride solution of equal conductivity.

Several different methods have previously been used for collecting for analysis the sweat which has been induced by pilocarpine iontophoresis. In one commonly used method, a small cup is applied to the sweating area of the patient's skin for a period on the order of about 30 minutes. After the amount of sweat necessary for analysis has been collected, the cup is removed and a capillary tube filled therefrom. The sweat sample in the capillary tube is then subjected to analysis.

The foregoing method has two significant disadvantages. Firstly, during the time period when the cup is removed from the patient's skin and the capillary tube is being loaded with a sample, some evaporation will take place. This, of course, has the effect of increasing the chloride level of the liquid sweat remaining. Secondly, because the sample is exposed during the transfer operation wherein the sweat is removed from the collecting cup and loaded in the capillary tube, there is a substantial likelihood that the sample may become contaminated by any of a multitude of materials which, when chloride level is determined by conductivity, could alter the conductivity of the sample and thus render the determination inaccurate.

SUMMARY OF THE INVENTION

The invention seeks to provide a means whereby the two principal disadvantages present in standard sweat analysis testing procedures may be overcome. Specifically, the invention provides a combination collection and measuring electrode structure whereby the conductivity of a sweat sample may be measured with only a minimal exposure of the sample to the air thereby substantially reducing the possibility of evaporation and of contamination. This is accomplished by providing a generally funnel shaped structure which is formed of plastic for disposability and which includes a narrow neck which is sealed. In the neck two spaced electrodes are located and the same have exposed portions extending towards the conical portion of the funnel as well as connecting portions extending rearwardly therefrom for plug-in connection to an analyzing device, either directly or through an electrical lead. In use, after localized sweating has been induced, the open end of the funnel shaped structure is applied to the area wherein sweating has been induced and the structure is then strapped to the patient. With very little pressure applied by the strap, an effective seal may be provided so that evaporation will be precluded from taking place and contaminants will not be permitted to reach the inside of the funnel shaped structure. After a suitable amount of sweat has been collected, the structure is removed from the patient and preferably covered, for example, with a suitable cap which snaps on over the open end of the funnel. After insuring that the collected sweat has drained into the neck of the funnel into contact with the exposed portions of the electrodes, as for example, by suitably shaking or tapping the structure, the connecting portions of the electrodes are then connected to an analyzing device and the sweat analyzed.

Other objects and advantages of the invention will become apparent from the following specification taken in conjunction with the accompanying drawings.

DESCRIPTION OF THE DRAWINGS

FIG. 1 is a perspective view illustrating a combination collecting and measuring electrode made according to the invention applied to the arm of a patient;

FIG. 2 is a front elevational view of the electrode connected to an analyzing meter;

FIG. 3 is a perspective view of the electrode disassociated from both the meter and the patient;

FIG. 4 is an enlarged, fragmentary vertical section of the neck of the electrode;

FIG. 5 is a horizontal section taken approximately along the line 5—5 of FIG. 4; and FIG. 6 is a horizontal section taken approximately along the line 6—6 of FIG. 4.

DESCRIPTION OF THE PREFERRED EMBODIMENT

An exemplary embodiment of a combination collection and measuring electrode made according to the invention is illustrated in one mode of intended use in FIG. 1. The electrode is seen to comprise a funnel shaped structure, generally designated 10 which is comprised of an inverted, open based frustoconical collecting portion 12 terminating in a neck 14. As illustrated, the electrode 10 is applied to the forearm H of a patient and held in place thereon by means of a strap 16 having a plurality of apertures 18 therein. By inserting the neck 14 through one of the apertures 18 at one end of the strap 16, the electrode 10 may be located in place on the arm H and thereafter, strap 16 may be pulled sufficiently tight so as to provide the desired sealing pressure between the conical collecting portion 12 and the arm H and then the neck 14 forced through an aperture 18 adjacent the other end of the strap 16.

The neck 14 of the electrode 10 terminates in an electrical receptacle 20 in which an electrical connector 22 may be received. As viewed in FIG. 2, the electrical connector 22 is in turn connected by a lead 24 to a meter 26. Alternatively, the electrical connector 22 may be integrally formed with the meter 26 so that the electrode 10 may be plugged directly into the meter 26. The meter 26, by any known technique, may measure the conductivity of sweat collected within the electrode 10 in a manner to be described in greater detail hereinafter.

Turning to FIGS. 3 and 4, the neck 14 of the electrode 10 is seen to be generally cylindrical in shape and has, at its upper end, a sample area 28 which is separated from the receptacle portion 20 by an integrally molded barrier 30 located about midway along the length of the neck 14. A pair of electrodes 32 extend through the barrier 30 in both directions and include analyzing ends 34 located within the sample area 28 and connection ends 36 located within the receptacle 20.

The electrodes 32 are maintained in the just described position by means of their being provided with securing means, such as enlarged cylindrical formations 38 which are molded within the barrier 30. Alternatively, the securing means may take the form of one or more recesses formed in the electrodes 32, with the material of barrier 30 extending into the recesses. As a result, the electrodes 32 are firmly fixed in their position.

As best viewed in FIGS. 4 and 5, the sample area 28 includes a pair of narrowing means 40 which are integrally molded with the electrode 10. The upper end 42 of each narrowing means is sloped while the vertical sides 44 thereof are planar. The narrowing means 40 serve to decrease the volume of the sample area 28 to thereby minimize the amount of sample required to make an analysis.

With reference to FIGS. 4 and 6, it will be seen that the receptacle portion 20 of the neck 14 includes a planar surface 46 on one side thereof which serves as a key to insure that a correspondingly keyed connector 22 can be electrically connected to the ends 36 of the electrodes 32 in but one way. That is, the key provided by the surface 46 insures that a connector 22 cannot be joined to the electrode ends 36 in a position rotated 180° from that which is intended.

The combination collecting and measuring electrode 10 preferably is molded in one piece of any suitable known plastic so as to provide a structure which may be used once and then disposed of. Of course, the actual electrodes 32 will not be formed of a plastic. Rather, they may be formed of any suitable electrically conducting material which will not undergo a chemical reaction with the sample received in the sample area 28. That is, at least the exposed surfaces of the measuring ends 34 of electrodes 32 must be inert with respect to the sample being analyzed. In one embodiment of the invention, the electrodes 32 are formed of copper having a nickel plating of 0.0001 to 0.0002 inch thick which is then platinized, for example, by the known chemideposit method with a platinum alloy such as PC 96 (Alloy 1,000) which may be obtained from Matthey-Bishop, Inc.

While the actual dimensions of the combination collection and measuring electrode may vary depending upon various factors including the nature of the analyzing device with which it is used, in order to minimize the volume of the sample required to perform the analysis, it has been found desirable to have the vertical planar walls of the narrowing means 40 spaced a distance of about one-tenth of an inch. The centers of the electrodes 32 may then be spaced a distance of about one-tenth of an inch and the analyzing portions 34 may project into the sample area 28 from the barrier 30 a distance of about one-twentieth of an inch. Using such dimensions, a sample as small as about 19 microliters is sufficient for the determination.

While the combination collection and measuring electrode is not limited to use with particular instruments, it is particularly well suited to be used with the iontophoresis electrode disclosed in the copending application of Richard A. Reeves, entitled "Disposable Iontophoresis Electrode," assigned to the same assignee as the instant application and filed concurrently herewith. Similarly, the meter 26 is desirably, but not necessarily, that disclosed in the copending application of Donald A. Ninke and James F. La Hay entitled "Iontophoresis and Conductivity Analysis Circuit," assigned to the same assignee as the instant application and filed concurrently herewith.

The invention may be used as follows. Using the Reeves iontophoresis electrode and the Ninke and La Hay circuit, sweating may be induced by iontophoresis in the manner disclosed in the above-identified application of Reeves extending the process of iontophoresis over a period of about 5 minutes. Thereafter, the localized area may be wiped with distilled water and the combination collection and measuring electrode 10 applied to the area in the manner described previously. After about 30 minutes, the patient will have generally sweated a sufficient amount of liquid so that a sufficient sample will have been collected in the conical collecting portion 12. At this time, the electrode 10 is removed from the patient, covered with a suitable snap-on cap 48 to avoid exposing the sample to the air, and suitably shaken or tapped so as to drain the collected sweat into the sample area 28 into contact with the analyzing ends 34 of the electrodes 32. The connection ends 36 of the electrodes 32 are then connected to an analyzing meter 26 such as that disclosed in the above-identified application of Ninke and La Hay. If the meter is provided with an integral electrical connector, the electrode 10 may be plugged directly thereinto; otherwise, an electrical connector 22 and lead 24 may be used to connect the electrode to the meter. The sweat within the sample area 28 is then analyzed, and if the Ninke and La Hay meter is used, this will result in a direct reading on the meter 26 of the chloride level of the sweat for diagnostic purposes.

It will be recognized that from the time of application of the combination collection and measuring electrode 10 to the patient's arm H until the actual analysis is performed, the sample area 28 will be isolated from the atmosphere by means of the conical portion 12, the upper neck walls 14 and the barrier 30 of the combination collection and measuring electrode 10 and either the skin of the patient's arm or the cap 48. Thus, there is substantially no opportunity for evaporation of the sample and the possibility of contamination of the sample is substantially reduced.

After the meter 26 has been read, the device may then be disassembled and the combination collecting and measuring electrode 10 disposed of in any suitable manner.

Having described a preferred embodiment of my invention, I do not wish to be limited to the details set forth, but rather, to have the same construed broadly as set forth in the following claims.

I claim:

1. The method of collecting and measuring a sample of sweat from a patient, comprising the steps of:
   inducing sweat on an area of the patient's skin,
   placing over the area a sweat collecting receptacle having a pair of spaced electrodes located therein,
   collecting the induced sweat in the receptacle,
   orienting the receptacle to cause the collected sweat to contact the pair of electrodes, and
   connecting the electrodes to a conductivity measuring device in order to analyze the sweat sample.

2. The method of claim 1 in which the step of orienting the receptacle includes the steps of removing the receptacle from the skin of the patient, and locating the removed receptacle so that the collected sweat drains into contact with the pair of electrodes.

3. The method of claim 2 including the additional step of covering the receptacle after removal from the skin of the patient to prevent evaporation of the collected sweat.

4. The method of claim 1 in which the step of placing the receptacle over the area includes the steps of applying an open end of a funnel-shaped structure forming the receptacle over the area where sweat has been induced and strapping the funnel-shaped structure to the patient to form a seal which precludes evaporation of the sweat being collected.

5. The method of claim 1 in which the step of collecting the induced sweat in the receptacle includes the steps of gathering the induced sweat over a selected area of the patient's skin and decreasing the area in the vicinity of the pair of electrodes to minimize the sample required to make an analysis.

* * * * *